(12) United States Patent
Gu (10) Patent No.: US 7,400,674 B2
(45) Date of Patent: Jul. 15, 2008

(54) METHOD AND DEVICE FOR CONTROLLING TRANSMISSION OF SETS OF DATA

(75) Inventor: Jian Gu, Guangdong (CN)

(73) Assignee: Nokia Corporation, Espoo (FI)

( * ) Notice: Subject to any disclaimer, the term of this patent is extended or adjusted under 35 U.S.C. 154(b) by 828 days.

(21) Appl. No.: 10/851,093

(22) Filed: May 24, 2004

(65) Prior Publication Data

US 2005/0201453 A1 Sep. 15, 2005

(30) Foreign Application Priority Data

Mar. 11, 2004 (FI) .................................. 20040389

(51) Int. Cl.
*H04B 17/00* (2006.01)
(52) U.S. Cl. ..................................................... 375/225
(58) Field of Classification Search ................. 375/225, 375/358; 379/93.08, 93.31; 714/708; 455/69
See application file for complete search history.

(56) References Cited

U.S. PATENT DOCUMENTS

| 6,208,663 | B1 | 3/2001 | Schramm et al. |
| 2003/0039227 | A1 | 2/2003 | Kwak |

FOREIGN PATENT DOCUMENTS

EP 1 492 263 A1 12/2004

OTHER PUBLICATIONS

David W. Paranchych et al., "A Method for Outer Loop Rate Control in High Data Rate Wireless Networks," IEEE VTC 2002 Spring, vol. 3, p. 1701-1705.
Michiharu Nakamura et al., "Adaptive Control of Link Adaptation for High Speed Downlink Packet Access (HSPDA) in W-CDMA,"Proceedings WPMD, Sep. 2002, p. 382-386.
"Selection of MCS Levels in HSDPA," a TSG-RAN working group document TSG R1-01-0579 by NEC and Telecom Domus 2001.

*Primary Examiner*—Sam K Ahn
(74) *Attorney, Agent, or Firm*—Squire, Sanders & Dempsey, LLP (57) ABSTRACT

A method for controlling transmission of sets of data comprises receiving information relating to at least a part of a first data set. This information may comprise the at least part of the first set of data or an indication of receipt of the at least part of the first set of data. The number of times that at least a part of the first set of data has been transmitted is determined. At least one threshold for a quantity indicative of transmission conditions is updated based on the determined number of times, said at least one threshold being for determining a transmission rate for at least a part of a set of data. Determining a transmission rate for at least a part of a second set of data is also discussed.

48 Claims, 8 Drawing Sheets

| j / r | 1 | 2 | · · · | N |
|---|---|---|---|---|
| $r_1$ | $T(r_1,1)$ | $T(r_1,2)$ | | $T(r_1,N)$ |
| $r_2$ | $T(r_2,1)$ | $T(r_2,2)$ | | $T(r_2,N)$ |
| ⋮ | | | | |
| $r_L$ | $T(r_L,1)$ | $T(r_L,2)$ | | $T(r_L,N)$ |

METHOD AND DEVICE FOR CONTROLLING TRANSMISSION OF SETS OF DATA

BACKGROUND OF THE INVENTION

1. Field of the Invention

The present invention relates to controlling transmission of sets of data and to transmitting sets of data. In particular the present invention relates to controlling transmission when at least a part of a set of data may be transmitted for a number of times.

2. Description of the Related Art

A communication system can be seen as a facility that enables communication between two or more entities such as user equipment and/or other nodes associated with the system. The communication may comprise, for example, communication of voice, data, multimedia and so on. The communication system may be circuit switched or packet switched. The communication system may be configured to provide wireless communication.

In a communication system, there is typically need to adjust transmission parameters to changing channel conditions. Link adaptation refers to changing transmission parameters of a communication channel to compensate for the variations in the channel conditions. Transmission parameters refer here to, for example, transmission power and transmission rate. In the following, transmission rate control is discussed in more detail.

In a communication system, data transmission may be defined as combinations of channel coding methods, modulation techniques, and, in a spread spectrum system, spreading spectrum techniques. Such a combination defines a specific transmission rate for user data. A combination of a channel coding method and a modulation technique is often referred to as a modulation and coding scheme (MCS).

One example of a known link adaptation technique is Adaptive Modulation and Coding Scheme (AMCS). In AMCS, a modulation and coding scheme (MCS) is selected for transmission based on estimated receiver signal quality. The basic principle is to use higher modulation levels and higher channel coding rates, when the channel condition is good, and lower modulation levels and lower channel coding rates, when the channel condition is not so good.

Typically the modulation and coding schemes are arranged to an order in accordance with the respective transmission rates, and the modulation and coding schemes are called MCS levels. The selection from a set of modulation and coding schemes is made using thresholds. Thresholds are defined in terms of channel quality, for example, as signal-to-interference ratio (SIR) values. Given an estimated channel quality, the MCS having a threshold value smaller than the given estimated channel quality and providing the largest transmission rate is typically selected in AMCS.

It has been noted that correct switching points between adjacent MCS schemes are dependent, for example, on the channel Doppler experienced by the receiver and on the multipath propagation. Fixed threshold values are therefore not sufficient for efficient link adaptation using AMCS. There have been a number of proposals for adjusting the thresholds.

In "Selection of MCS levels in HSDPA", a TSG-RAN working group document TSG R1-01-0579 by NEC and Telecom Domus, link adaptation in a High Speed Downlink Packet Access (HSDPA) in a Wideband Code Division Multiple Access (WCDMA) system is discussed. It is proposed to adjust the threshold values for the MCS levels according to cyclic redundancy check (CRC) results of a data received at the mobile station. The mobile station sends acknowledgement messages accordingly to the CRC results to a base station. The threshold values are updated based on ACK and NAK messages received at the base station. In "Adaptive Control of Link Adaptation for High Speed Downlink Packet Access (HSDPA) in W-CDMA", by M. Nakamura, Y. Awad and S. Vadgama, in Proceedings WPMD, pp. 382-386, September 2002, the above mentioned algorithm is developed further. The threshold values are adjusted only, if the estimated channel quality at the mobile station is within a certain band of the current threshold value.

Dynamical adjustment of the thresholds is discussed in "A Method for Outer Loop Rate Control in High Data Rate Wireless Networks", by D. Paranchych and M. Yavuz, in IEEE VTC'2002 Spring, Vol. 3, pp. 1701-1705. This method is presented in connection with an IS-865 system, which is a CDMA cellular air interface. In IS-865, a data rate control mechanism is employed in the downlink (forward link) direction to adapt the transmitted data rate to changing channel conditions. An access terminal (a mobile station) measures the channel conditions, for example the received pilot $E_c/N_t$, for determining the maximum achievable data rate for the downlink transmission. Data transmission must meet a certain maximum average packet error rate (PER) requirement, which is defined for standard access terminals. The proposed method is to select the data rate using thresholds for the received pilot $E_c/N_t$, and to adjust the thresholds for received pilot $E_c/N_t$ so that the desired PER is achieved. The method is thus a rate control method, where the received pilot $E_c/N_t$ is used in an inner loop in the access terminal. The outer loop control, implemented also in the access terminal, monitors the received PER and adjusts the thresholds used in the inner loop so that a transmission rate achieving the desired PER is used. The following procedure is carried out for adjusting the thresholds. If a downlink packet is received in error, the thresholds are increased. If a downlink packet is received successfully, the thresholds are decreased. The threshold for the current transmission rate in increased/decreased with one step size, and the thresholds for all transmission rates are increased/decreased with a second step size.

Another technique is Hybrid Automatic Repeat reQuest (HARQ). The HARQ scheme combines forward error correction (FEC) and Automatic Repeat reQuest (ARQ). In HARQ, a receiver acknowledges a successfully received frame with an ACK message. Upon receipt of ACK, the transmitter knows that retransmissions are unnecessary. If a frame is received in error, the receiver sends a negative acknowledgement NAK to the transmitter and saves the received symbols. The transmitter consequently retransmits the frame. The receiver receives second symbols relating to the retransmitted frame, and soft-combines the stored first symbols and the received second symbols. This soft-combining reduces the error rate of the retransmitted frames, as previously received information relating to the same frame is employed.

Adaptive HARQ is a version of HARQ, where the data rate for each transmission and each retransmission may be adapted. In non-adaptive HARQ, the method for selecting the data rates in each retransmission is the same as that for selecting the data rates in each initial transmission.

It is proposed to use both fast closed loop rate control and adaptive HARQ in some communication systems for providing high-speed packet data transmission. The problem is that, for example, the outer loop rate control method proposed by D. Paranchych and M. Yavuz does not consider the effect of adaptive HARQ and cannot maintain the performance of each HARQ (re)transmission to a predetermined level. This means, for example, that too much transmission power is used in the retransmissions so that the power is wasted and the HARQ gain is not well utilized. Alternatively, too little transmission power may be used in the retransmission so that the residual FER is high and the HARQ gain is again not well utilized.

Dynamic thresholds for transmission rate selection are advantageous over the fixed thresholds. Adjusting the thresholds is crucial to the system throughput and residual Packet Error Rate (PER). Proper thresholds reduce the transmit power and keep the communication channel quality in a given level under different channel conditions. Adjusting the thresholds properly may thus increase the throughput of interference-limited wireless communications systems.

There is thus need for controlling transmission rate in combination with possible retransmissions.

SUMMARY OF THE INVENTION

A first aspect of the present invention relates to a method for controlling transmission of sets of data, said method comprising
  receiving information relating to at least a part of a first set of data,
  determining a number of times that at least a part of said first set of data has been transmitted, and
  updating at least one threshold for a quantity indicative of transmission conditions based on the determined number of times, said at least one threshold being for determining a transmission rate for at least a part of a set of data.

A second aspect of the present invention relates to a method for transmitting a set of data, said method comprising
  determining a value for a quantity indicative of transmission conditions, and
  determining a transmission rate for at least a part of said set of data to be transmitted by comparing said determined value to at least one threshold for said quantity indicative of transmission conditions, said at least one threshold being dependent on the number of times data from said set of data has previously been transmitted.

A third aspect of the present invention relates to an apparatus configured to
  receive information relating to at least a part of a first set of data,
  determine a number of times that at least a part of said first set of data has been transmitted, and
  update at least one threshold for a quantity indicative of transmission conditions based on the determined number of times, said at least one threshold being for determining a transmission rate for at least a part of a set of data.

A fourth aspect of the present invention relates to a communications system configured to
  receive information relating to at least a part of a first set of data,
  determine a number of times that at least a part of said first set of data has been transmitted, and
  update at least one threshold for a quantity indicative of transmission conditions based on the determined number of times, said at least one threshold being for determining a transmission rate for at least a part of a set of data to be transmitted.

A fifth aspect of the present invention relates to an apparatus configured to
  determine a value for a quantity indicative of transmission conditions, and
  determine a transmission rate for at least a part of said set of data to be transmitted by comparing said determined value to at least one threshold for said quantity indicative of transmission conditions, said at least one threshold being dependent on the number of times data from said set of data has previously been transmitted.

A sixth aspect of the present invention relates to a communications system configured to
  determine a value for a quantity indicative of transmission conditions, and
  determine a transmission rate for at least a part of said set of data to be transmitted by comparing said determined value to at least one threshold for said quantity indicative of transmission conditions, said at least one threshold being dependent on the number of times data from said set of data has previously been transmitted.

BRIEF DESCRIPTION OF THE DRAWINGS

Embodiments of the present invention will now be described by way of example only with reference to the accompanying drawings, in which.

DETAILED DESCRIPTION OF EMBODIMENTS

Figure 1:
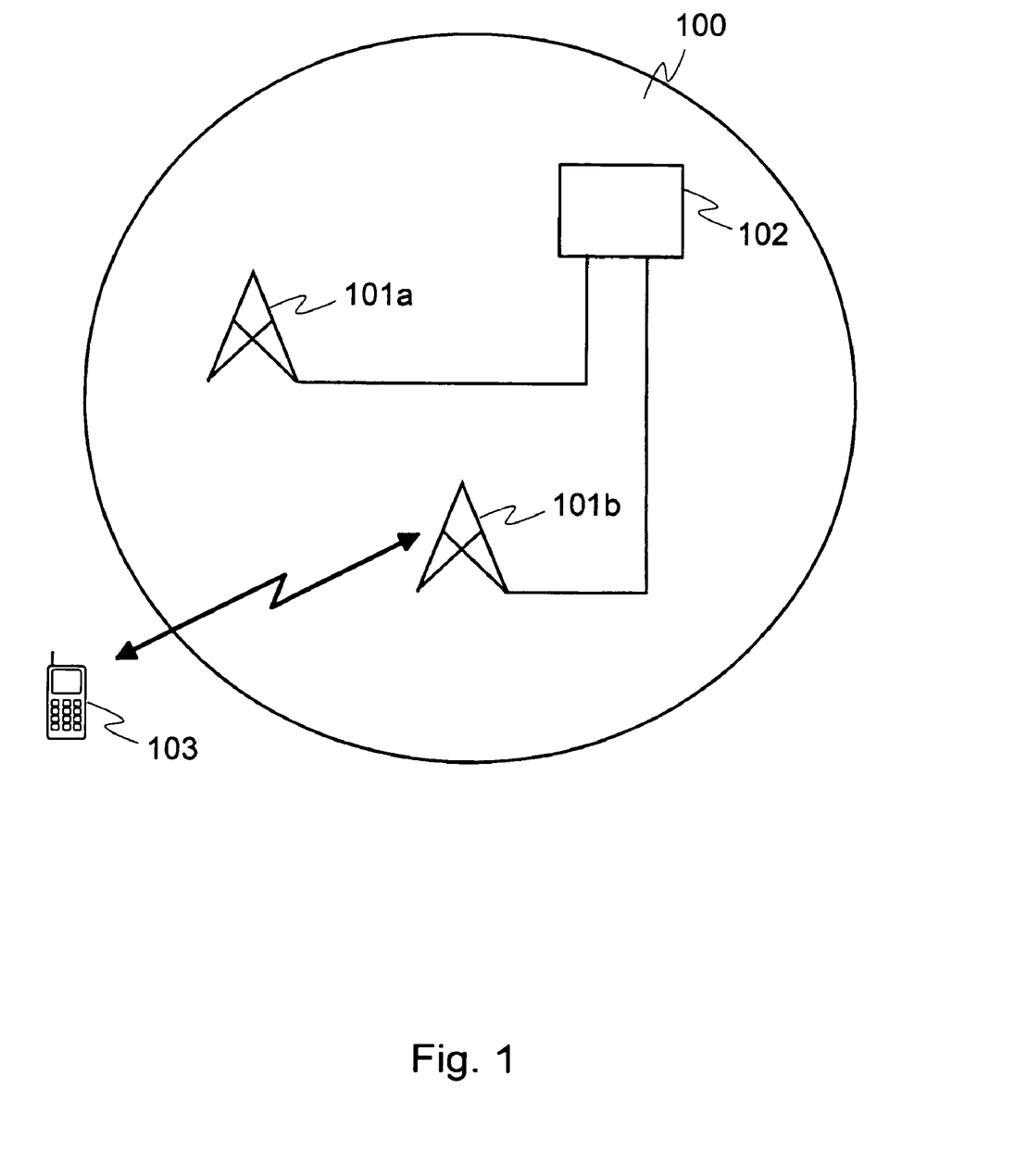
FIG. 1 shows, as an example, a communication system 100 where embodiments of the inventions are applicable.

FIG. 1 shows, as an example, a communication system 100 where embodiments of the inventions are applicable. The communication system 100 has transceiver network elements 101a and 101b, each transceiver network element 101a, 101b having transceiver equipment for transmitting and receiving data over a radio interface. The communication system 100 further has a control network element 102 for controlling radio resources. FIG. 1 also shows a communications device 103 for communications with the communications system 100.

The communication system 100 may be, for example, a WCDMA system. In this case a transceiver network element is called a Node B, a control network element is called Radio Network Controller (RNC) and a communications device is called a User Equipment (UE). A second example is the IS-856 system, where a communications device is called an Access Terminal, a transceiver network element is called an Access Point, and a control network element is called an Access Network Controller. A third example is the cdma2000

1× EV-DV system, where a communications device is called a Mobile Station, a transceiver element is called a Base Station, and a control network element is called a Base Station Controller. It is evident to one skilled in the art that the communication system 100 may be some other system than the ones specifically mentioned here.

The transmission rate on a communication channel is adjusted in accordance with the channel conditions. Typically there is defined a plurality of possible transmission rates and a plurality of thresholds, as discussed above in connection with the related art. A quantity indicative of transmission conditions, below referred to as a quality index, is estimated and compared to at least one threshold. If the estimated quality index value exceeds the threshold, it is possible to select the transmission rate associated with the threshold value. If the estimated quality index value exceeds a number of thresholds, typically the largest possible transmission rate is selected. This quality index can be, for example, SIR (a ratio of the signal power to the interference power), $E_b/N_0$ (a ratio of the combined received energy per information bit to the noise power spectral density), $E_b/N_t$ (a ratio of the combined received energy per information bit to the effective noise power spectral density), $E_c/I_0$ (a ratio of the pilot energy accumulated over one PN chip period to the total power spectral density in the received bandwidth), and C/I (a ratio of the carrier power to the interference power).

A first embodiment of the invention relates to transmitting data packets P over a communication channel, either from a communications device to a communications network or vice versa. The packets P are transmitted from a transmitting party and received in a receiving party. If a packet is received successfully, an acknowledgement ACK is sent to the transmitting party. If a packet is received in error, a negative acknowledgement NAK is sent to the transmitting party. The ACK/NAK may be, for example, a separate message or a part of feedback information sent to the transmitting party. If the transmitter receives a negative acknowledgement NAK, it retransmits the original packet P. The number of transmission/retransmission times n is counted for each packet. For the first transmission, n=1, and for the first retransmission n=2. Typically there is an upper limit N for the number of transmission times, so that n is smaller than or equal to N.

It is appreciated that in this first embodiment of the invention, a packet P is an example of a set of data in terms of the appended claims. As identical copies of the original packet P are retransmitted, the original packet and a retransmitted packet P are examples of at least a part of a set of data in terms of the appended claims.

Figure 2:
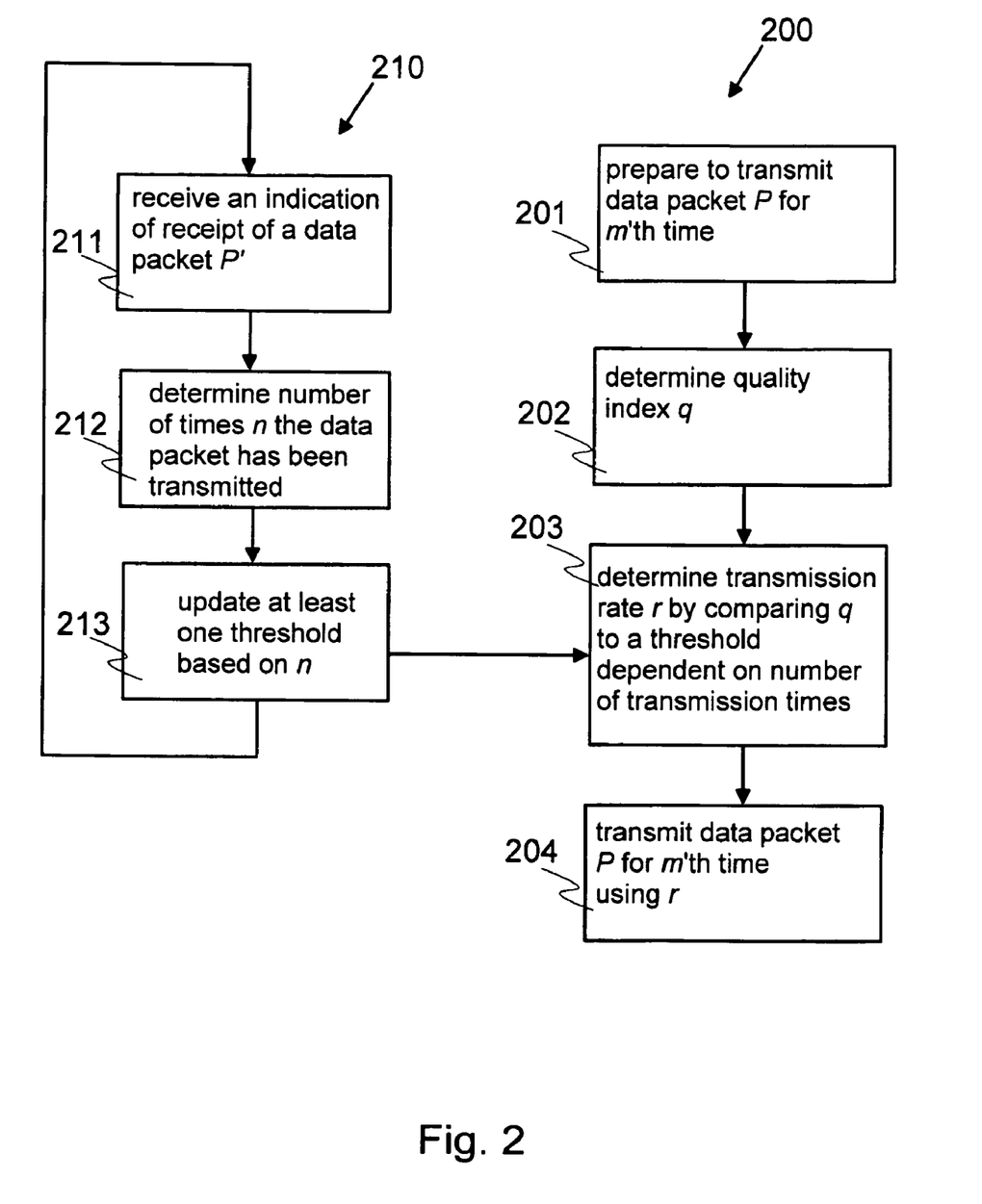
FIG. 2 shows a schematic flowchart of two methods in accordance with a first embodiment of the invention.

FIG. 2 shows a schematic flowchart of methods 200 and 210 in accordance with a first embodiment of the invention. Method 200 relates to the inner loop of a closed loop transmission rate control. In step 201, the transmitting party prepares to transmit a data packet P for the m'th time, $1 \leq m \leq N$. In step 202, a quality index value indicative of channel conditions in the transmit direction is determined. The receiving party may, for example, send to the transmitting party a quality index value or other feedback information based on measurements. Alternatively, the transmitting party may be able to determine a quality index value based on measured communication channel quality in the opposite direction than the transmit direction. In step 203, a transmission rate for the m'th transmission of the data packet P is determined by comparing the estimated quality index value to at least one threshold T, the threshold being dependent on the number of transmission times already taken place for the data packet P. Alternatively, this can be expressed by saying that the threshold is dependent on m, as m is equal the number of previous transmission times plus 1. In step 204, the data packet P is transmitted for the m'th time using the determined transmission rate.

Figure 3:
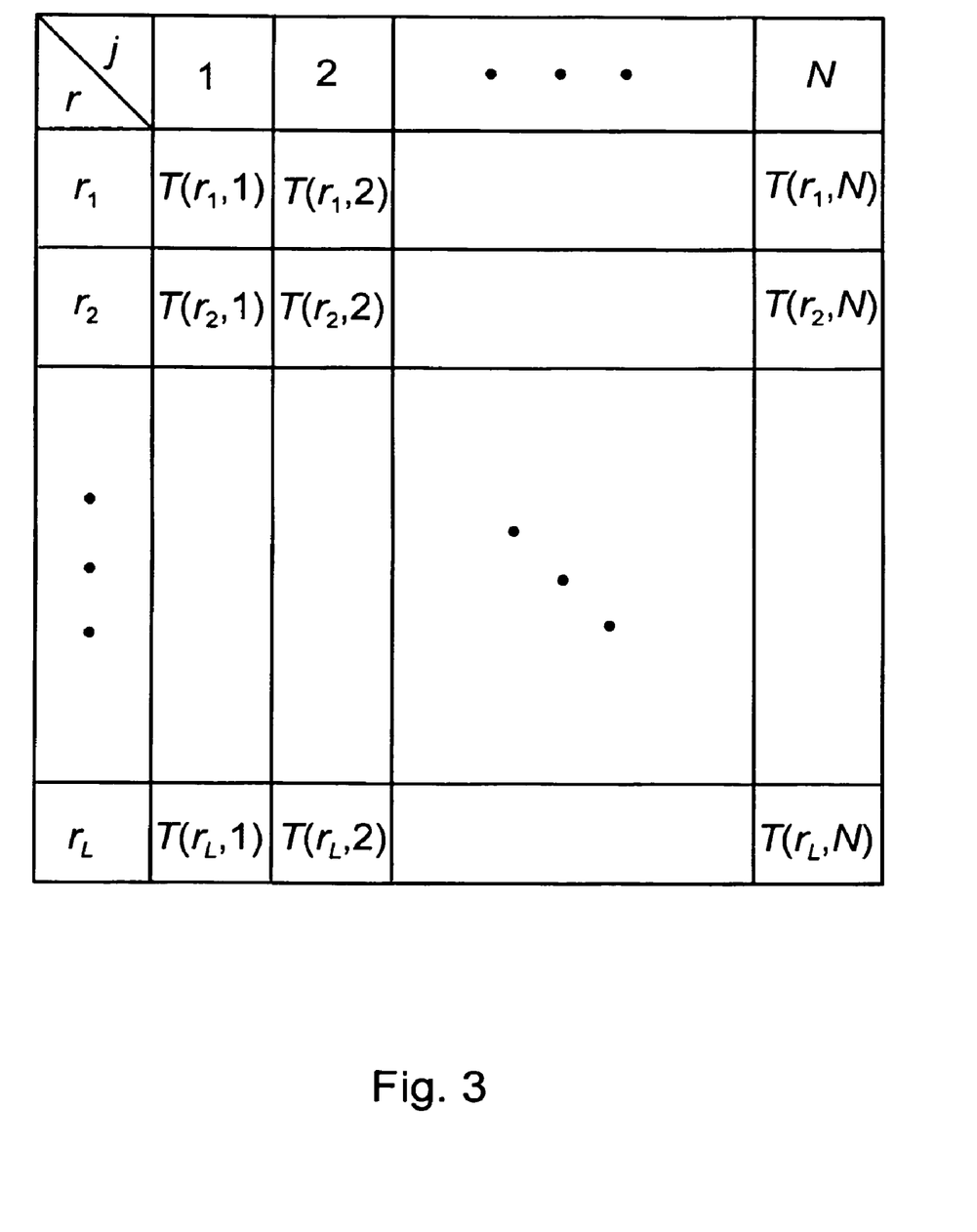
FIG. 3 shows, as an example, a table of threshold values for different transmission rates and for different number of transmission times.

The dependence of the threshold on the number of transmission times can be implemented, for example, by providing at least two sets of threshold values. A first threshold value set provides threshold values for a first set of numbers representing transmission times, the first set of numbers containing at least a first number. A second threshold value set provides threshold values for a second set of numbers representing transmission times, the second set of numbers containing at least a second number and being different from the first set of numbers. Typically there is a set of threshold values for each possible number of transmission times. In other words, the threshold values may be presented as a two-dimensional table, where one index represents the transmission rate associated with a threshold and the other index represents the number of transmission times. FIG. 3 shows a table for threshold values T(r,j), where r indicates a transmission rate, $r \in \{r_1, r_2, \ldots, r_L\}$ and j indicates a number of transmissions, $1 \leq j \leq N$. All the threshold values T(rj) need not be different. Some entries, columns or rows of the table in FIG. 3 may be identical.

As a second example, the dependence of the threshold values on the number of transmission times can be implemented using functions. A threshold value associated with a certain transmission rate r can be determined, for example, using a function which takes the number of transmission times and a transmission rate as input parameters: $f(r, m)$. Alternatively, the threshold values associated with a transmission rate r for a certain number of transmission times m may be determined using a function $f_m(r)$.

Different thresholds for different transmission times helps to utilize the HARQ gain. This means that, for example, the average FER after each transmission may be guaranteed to a predetermined, preferably optimum level so that the HARQ gain can be maximally utilized.

It is appreciated that the thresholds depending on the number of transmission times relating to a certain packet may be fixed or they may be adjustable.

Referring again to FIG. 2, the method 210 represents an outer loop of a closed loop transmission rate control for adjusting the thresholds. The method 210 adjusts the thresholds used in step 203 of the method 200. In step 211, an indication of receipt of a data packet P' is received in the transmitting party. In other words, an ACK or a NAK is received in this first embodiment of the invention. It is noted that the data packet P' may be the same data packet as the data packet P, or it may be a different data packet. Upon receiving the ACK or NAK, the transmitter determines the number of times n the data packet P' has been transmitted so far in step 212. This information is typically readily available in the transmitting party. In step 213, at least one threshold value is updated based on the number of transmission times n relating to the data packet P'. The threshold values are presented as threshold value sets relating to different numbers representing times of transmission, the at least one threshold value to be updated being selected based on n. If the threshold values are implemented using a function $f$, at least one input parameter a of the function can be adjusted. Some examples of the input parameter a are $\Delta_{local}$ or $\Delta_{global}$ (see discussion below) or frame error rate (FER) target values at different transmission times. In this case, the function may be, for example, $f(r, m, a)$ or $f_m(r, a)$.

When there are a number of threshold value sets, only the set relating to the n'th transmission (number of transmission in terms of the appended claims) of the data packet P' may be updated. Alternatively, the threshold value sets relating to numbers of transmission times equal to or larger than n may be updated. Similar reasoning applies to thresholds implemented as functions.

Updating a threshold refers to increasing the threshold or to decreasing the threshold. Typically thresholds are increased, when a data packet is received in error. This is because the error indicates that the channel condition is not sufficiently good for the transmission rate used for the transmission. Thresholds are decreased, when a data packet is received successfully. Increasing and decreasing thresholds is discussed in more detail in connection with a second embodiment of the invention.

Although the first embodiment above is discussed in connection with retransmission of identical replicas of a data packet, it is clear to one skilled in the art that the details of adjusting the thresholds are applicable also to other retransmission schemes.

The second embodiment of the invention is discussed here with reference to a system, where Hybrid Automatic Repeat reQuest HARQ is implemented in the following way for transmitting encoder packets using subpackets. An encoder packet is the packet output from a channel encoder. A subpacket is a packet transmitted in one HARQ procedure. This means that a subpacket contains some symbols of an encoder packet. This terminology is in line with cdma2000 specifications. A subpacket may contain only part of the data of the encoder packet. A subpacket relating to, for example, a second retransmission (m=3) may contains different part of the encoder packet than a subpacket relating to a first retransmission (m=2). Similarly, the subpacket relating to the original transmission (m=1) may contain different part of the encoder packet than at least some of the retransmissions. Receiving an encoder packet typically employs soft-combining, where each received subpacket contributes to the reception.

It is appreciated that in this second embodiment of the invention, an encoder packet is an example of a set of data in terms of the appended claims. A subpacket is an example of at least a part of a set of data in terms of the appended claims.

In the second embodiment of the invention, there is a threshold value set for each number of transmission times. The quality index indicative of channel conditions in this embodiment is, as a further example, the carrier-to-interference ratio. The threshold values are thus $C/I_T(r, j)$, where $r \in \{r_1, r_2, \ldots, r_L\}$ and $1 \leq j \leq N$.

Figure 4:
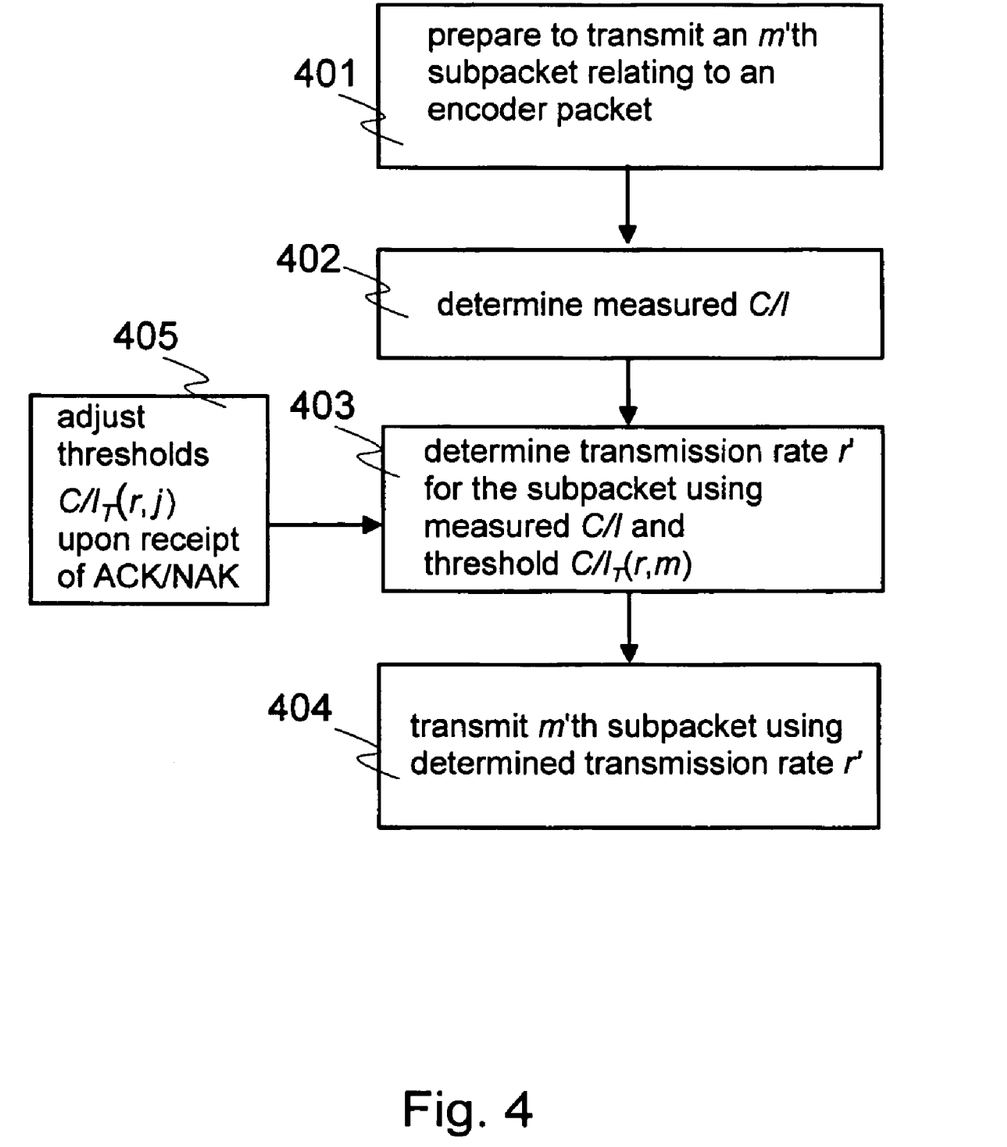
FIG. 4 shows a flowchart of a method in accordance with a second embodiment of the invention, the method relating to determining a transmission rate.

FIG. 4 shows a flowchart of a method 400 relating to the inner loop of a closed loop transmission rate control. In step 401, the transmitting party is preparing to transmit an m'th subpacket relating to an encoder packet EP. In step 402, the carrier-to-interference ratio is determined based on measurement reports from the receiving party. In step 403, a transmission rate r' is determined for the m'th subpacket using the determined C/I and thresholds $C/I^T(r,m)$. The m'th subpacket is then transmitted using the determined transmission rate r' in step 404. FIG. 4 shows also the outer loop of the closed loop transmission rate control as step 405, where thresholds $C/I_T(r,j)$ are updated upon receipt of an ACK or NAK from the receiving party.

Figure 5:
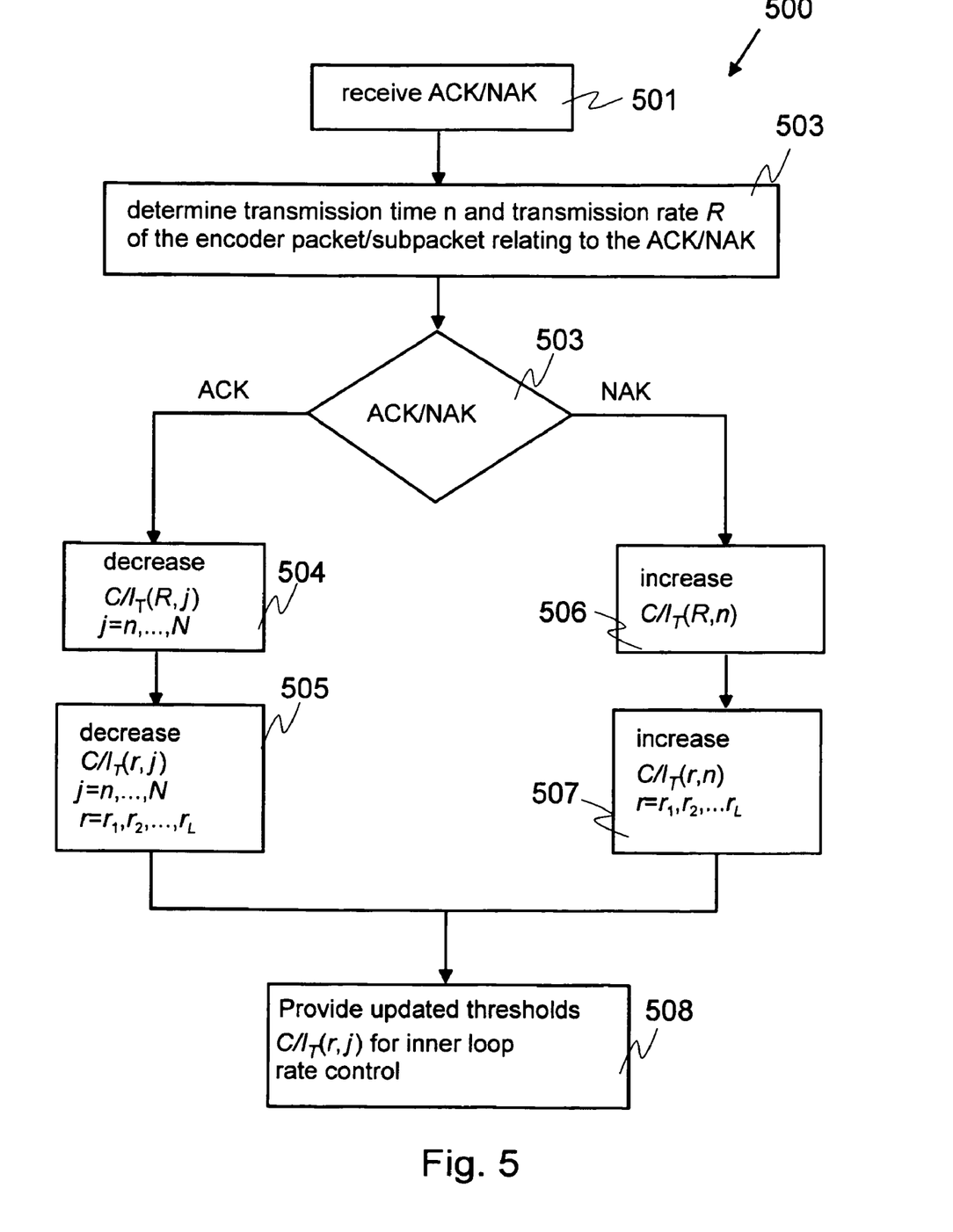
FIG. 5 shows a flowchart of a method in accordance with a second embodiment of the invention, the method relating to adjusting thresholds for determining a transmission rate.

FIG. 5 shows a flowchart of a method 500 relating to the outer loop of a closed loop transmission rate control. The method 500 gives details for step 405 in FIG. 4. In steps 501 an ACK or NAK message is received from the receiving party, indicating a successful or unsuccessful receipt of an n'th subpacket relating to an encoder packet EP'. It is noted that the encoder packet EP' may be the same encoder packet as the encoder packet EP, or it may be a different encoder packet. In step 502, the transmitting party determines for the subpacket relating to the ACK or NAK, what the number of transmission times n is and what the transmission rate R is. In step 503, it is determined whether an ACK or a NAK message was received. If the received indication of receipt was ACK, then the thresholds $C/I_T(R,j)$ are decreased in step 504 for $j=n, \ldots, N$. In step 505, the thresholds $C/I_T(r,j)$ are decreased for $j=n, \ldots, N$ and $r=r_1, r_2, \ldots, r_L$. If the received indication of receipt was NAK, then the threshold $C/I_T(R,n)$ is increased in step 506. In step 507, the thresholds $C/I_T(r,n)$ are increased for $r=r_1, r_2, \ldots, r_L$. In step 508, the updated thresholds are provided for the inner loop of the closed transmission rate control.

It is appreciated that when an ACK is received, in this second embodiment all thresholds relating to a number of transmission times equal to or larger than n are decreased. Furthermore, it is appreciated that when a NAK is received, thresholds relating to the n'th transmission time are increased. The reason for increasing only thresholds relating to the n'th transmission time is that after receiving a NAK, at least one more retransmission will be carried out. This means that there will be a chance to update thresholds relating to transmission times larger than n. Upon receipt of an ACK, thresholds equal to and larger than n are decreased. This is because there will be no more re-transmissions and, consequently, no further change to update these thresholds.

It is clear to one skilled in the art that decreasing the thresholds upon receipt of an ACK and increasing threshold upon receipt of a NAK relates to the fact that larger values of a quality index indicate better channel conditions and that the determined quality index value needs to exceed the threshold for selecting the transmission rate associated with that threshold. Should a quality index be chosen so that smaller values of the quality index indicate better channel conditions or should a threshold be defined as an upper or lower limit for the quality index, the updates may need to be performed differently.

As further details of the second embodiment, the decrease of thresholds in steps 504 and 505 is performed in the following way:

$$C/I_T(R, j) = \max\left(C/I_T(R, j) - \frac{\Delta_{local}}{1/PER_{set}(j) - 1}, C/I_{T\_min}(R, j)\right)$$

$$j = n, \ldots, N,$$

and $$C/I_T(r, j) = \max\left(C/I_T(r, j) - \frac{\Delta_{global}}{1/PER_{set}(j) - 1}, C/I_{T\_min}(r, j)\right)$$

$$j = n, \ldots, N$$

$$r = r_1, r_2, \ldots, r_L.$$

The increase of thresholds in steps 506 and 507 is performed in the following way:

$$C/I_T(R,n) = \min(C/I_T(R,n) + \Delta_{local}, C/I_{T\_max}(R,n))$$

and $$C/I_T(r,n) = \min(C/I_T(r,n) + \Delta_{global}, C/I_{T\_max}(r,n)), r=r_1, r_2, \ldots, r_L$$

The transmission rate is typically adjusted for achieving a predetermined Packet Error Rate PER target. Here parameters $PER_{set}(1)$ and $PER_{set}(j)/2$, $j=2, \ldots, N$ are the predetermined PER targets for the subpackets relating to an encoder packet. By setting $PER_{set}(1) > PER_{set}(2)/2 > \ldots > PER_{set}(N)/2 = PER_{set}$, the mechanism should converge to the desired target PER values.

The min and max functions in the above equations take care of not exceeding an upper limit for a threshold value or going under a lower limit for a threshold value, respectively. Regarding the lower limits, the parameter $C/I_{T\_min}(r,j)$, $r=r_1, r_2, \ldots, r_L$, $j=1, \ldots, N$ is the minimum traffic channel C/I threshold of the data. The parameter $C/I_{T\_min}(r,1)$, $r=r_1, r_2, \ldots, r_L$ is the C/I of the data rate r, required for $PER=PER_{set}$ over AWGN (Additional White Gaussian Noise) channel.

The parameter $\Delta_{local}$ is a local step for adjusting the thresholds relating to the transmission rate R, which is the data rate of the subpacket that is related with the received ACK/NAK. The parameter $\Delta_{global}$ is a global step for adjusting the thresholds relating to all transmission rates r. It is possible that the local step is zero: $\Delta_{local}=0$. However, as the local step adjusts the relative positions of the thresholds and the global step guarantees overall PER performance, the local step is typically non-zero.

It is furthermore possible that the steps $\Delta_{global}$ and $\Delta_{local}$ are dependent on the number of transmission times. In this case, their order is preferably the following: $0 \leq \Delta_{local}(2) \leq \ldots \leq \Delta_{local}(N)$ and $0 \leq \Delta_{global}(2) \leq \ldots \leq \Delta_{global}(N)$. This can bring smaller threshold variations because $PER_{set}(2) > \ldots > PER_{set}(N)$. In other words, as $C/I_T(r,j)$ is updated less frequently with increasing j, the step size increases with increasing j. A larger step used less frequently for updating threshold values helps the mechanism to converge faster.

The second embodiment of the invention is applicable, for example, in Forward Packet Data Channel (F-PDCH) in cdma2000 1x EV-DV (EVolution to Data and Voice) or in the High Speed Downlink Shared Channel (HS-DSCH) in the WCDMA system.

Although the second embodiment above is discussed in connection with transmitting and retransmitting at least part of an encoder packet, it is clear to one skilled in the art that the details of adjusting the thresholds are applicable also to other retransmission schemes.

The thresholds in the second embodiment may be sender specific. This means that, for example, a specific transceiver network element uses the same thresholds for all communications devices of users using Adapted HARQ. The users may share a communications channel or communications channels employing Adapted HARQ, the users may communicate using a common channel or common channels employing Adapted HARQ, some of the users may have their own channels employing Adaptive HARQ, or each of the users may have his own channel employing Adaptive HARQ.

Selection of the local and global step sizes for transmission rate control is discussed next. The most important is to select properly the values for $\Delta_{local}(1)$, $\Delta_{local}(N)$, $\Delta_{global}(1)$ and $\Delta_{global}(N)$. Typical values for $\Delta_{local}(N)$ and $\Delta_{global}(N)$ are from 0.3 dB to 1 dB. A suitable value for $\Delta_{local}(1)$ and $\Delta_{global}(1)$ is from 0.01 dB to 0.1 dB, depending on the PER target for the initial transmissions (j=1). In most cases, $\Delta_{local}(1)$ or $\Delta_{global}(1)$ should not be larger than 0.1 dB, because the PER target of the initial transmissions is in the order of 50%. Large steps bring too large variations to thresholds. One possible way to select the step sizes is to select them so that the following equations hold:

$$\frac{\Delta_{local}(1)}{\frac{1}{PER_{set}(1)} - 1} = \frac{\Delta_{local}(2)}{\frac{2}{PER_{set}(2)} - 1} = \ldots = \frac{\Delta_{local}(N)}{\frac{2}{PER_{set}(N)} - 1} \text{ and}$$

$$\frac{\Delta_{global}(1)}{\frac{1}{PER_{set}(1)} - 1} = \frac{\Delta_{global}(2)}{\frac{2}{PER_{set}(2)} - 1} = \ldots = \frac{\Delta_{global}(N)}{\frac{2}{PER_{set}(N)} - 1}.$$

In a third embodiment of the invention, thresholds are defined for recipients μ sharing a communications channel, where retransmissions and rate adaptation is applied. The term recipient here refers to a receiving party, for example, to a communications device of a user. This third embodiment is applicable, for example, in both Forward Packet Data Channel (F-PDCH) in cdma2000 1× EV-DV (EVolution to Data and Voice) and the High Speed Downlink Shared Channel (HS-DSCH) in the WCDMA system.

The third embodiment is otherwise similar to the second embodiment, except that there are recipient-specific threshold tables (threshold value sets). When an indication of receipt is received from one of the recipients, the thresholds values relating to that specific recipient are updated with a step. The threshold values for a further recipient may be updated with another step based on the indication of reception from this specific recipient. If thresholds relating to all recipients are updated with the same step upon receipt of an indication of receipt from one recipient, the recipient-specific sets of thresholds reduce to one sender-specific set of thresholds.

The following parameters mentioned in connection with the second embodiment may be recipient-specific in the third embodiment: thresholds $C/I_T(r,j,u)$, local steps $\Delta_{local}(j,u)$, global steps $\Delta_{global}(j,u)$, predefined packet error rates $PER_{set}(j,u)$. Furthermore, the upper and lower limits for thresholds may also be recipient specific.

The differences between using sender-specific thresholds (the second embodiment) or recipient-specific thresholds (the third embodiment) are at least the following. Sender-specific thresholds $C/I_T(r,j)$ are able to guarantee the PER of the packets sent from the transmitting party (sender) to a given $PER_{set}$. Recipient-specific thresholds $C/I_T(r,j,u)$ can guarantee both the PER of the packets sent from the transmitting party and PER of the packets sent to each recipient to a given $PER_{set}$. When there are a number of recipients relating to one sender, a closed loop transmission rate control using sender-specific thresholds may converge faster.

Furthermore, a system that supports more than one simultaneous user on a channel using Adaptive HARQ or more than one channel using Adaptive HARQ can typically use the method with the recipient-specific thresholds. This is because if there are received, for example, simultaneously an ACK and a NAK, it may be difficult to judge how to update sender-specific thresholds. A system supporting, for example, more than one F-PDCCH (Forward Packet Data Control Channel) or HS-SCCH (High Speed Shared Control Channel) should in general use communication device specific thresholds. A system that supports only one simultaneous user on a channel using Adaptive HARQ may use either of the transceiver network element specific or user-specific thresholds. This means that a system supporting only one F-PDCCH or HS-SCCH can use both.

It is appreciated that in a HSDPA system the following terminology is used. The term packet relates to an encoder packet in the sense of the cdma2000 specifications. A data block relates to a subpacket in the sense of the cdma2000 specifications. It is therefore appreciated that a packet in the HSDPA system is an example of a set of data in terms of the appended claims. A data block in the HSDPA system is an example of at least a part of a set of data in terms of the appended claims.

It is appreciated that embodiments of the invention may be applicable both in the downlink (forward) and in the uplink (reverse) direction in cellular and other communication systems. It is also appreciated that for adaptive coding and modulation in the uplink direction (transmission from a communications device of a user), the data rate may be determined either in the communications device, in a network element or jointly by both.

Figure 6:
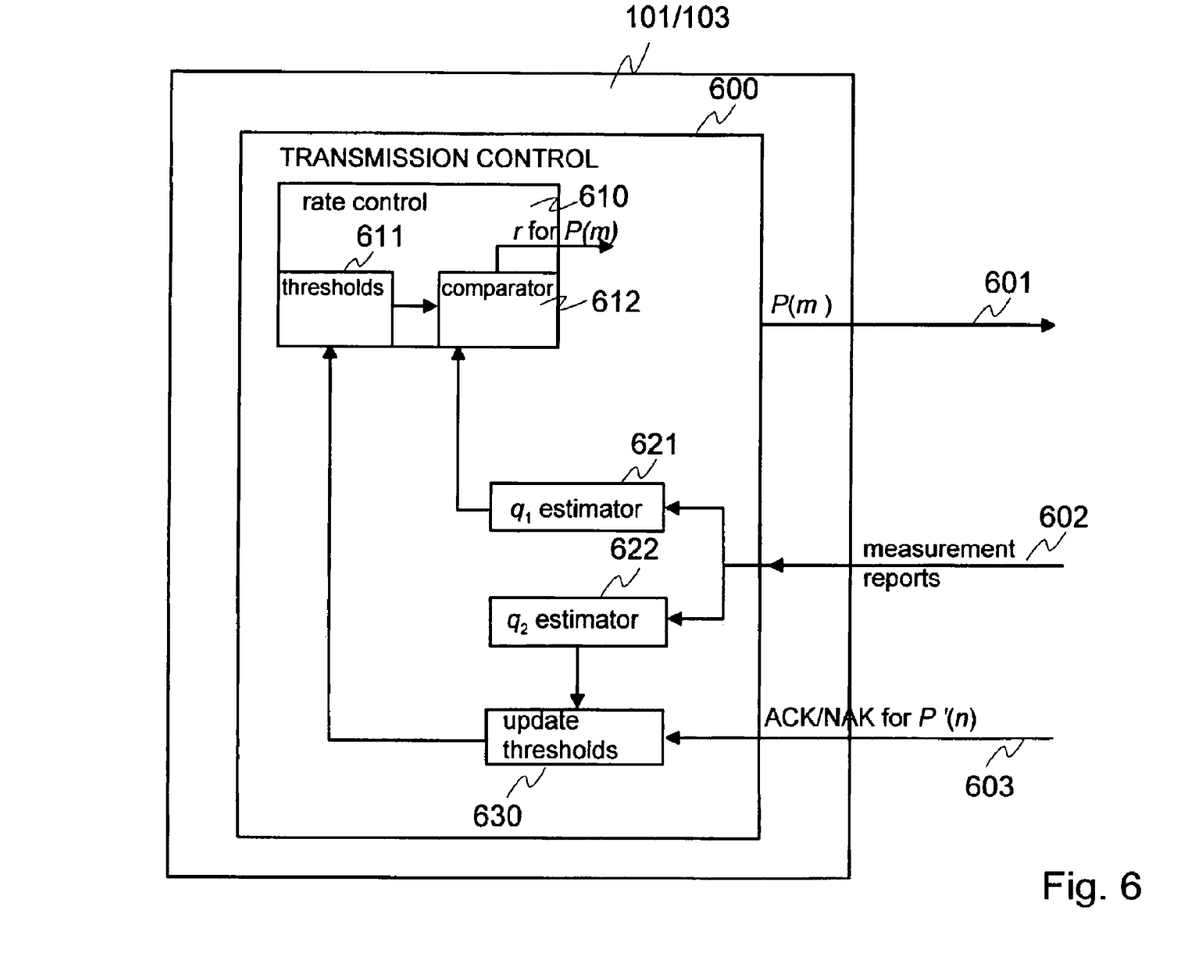
FIG. 6 shows, as an example, a schematic block diagram of a communications device or a network element in accordance with an embodiment of the invention.

FIG. 6 shows, as an example, a schematic block diagram of a communications device 103 or a network element 101 in accordance with an embodiment of the invention. As FIG. 6 shows, the rate control 610 forms part of transmission control 600. It is appreciated that in FIGS. 6 and 7 only blocks and functionality relevant for understanding the present invention are shown in detail.

FIG. 6 uses notation relating partly to the first embodiment of the invention. A transmission rate r for transmitting a data packet P for the m'th time (arrow 601 in FIG. 1) is determined in the following way in the transmitting party. A quality index $q_1$ is determined in quality estimator 621 based on measurement reports 602 from a recipient. The quality index $q_1$ may be, for example, the signal-to-interference ratio SIR. The quality estimator 621 relates thus to step 202 in FIG. 2. The estimated quality index $q_1$ is compared to thresholds dependent on the number of transmission times m in the comparator 612 (step 203 in FIG. 2). In FIG. 6, the threshold values are stored in the thresholds block 611. The thresholds values may be, for example, a table as shown in FIG. 3.

The threshold values in the threshold block 611 are updated in the following way. The transmitting party receives an indication of receipt of a data packet P' (arrow 603). Information about this indication is fed to an update thresholds block 630. As the update of threshold values may be dependent on a second quality index $q_2$, quality index values from a second quality estimator 622 are input to the update thresholds block 630. This second quality index $q_2$ may be, for example, the packet error rate PER. The update thresholds block 630 relates to method 210 in FIG. 2.

As mentioned, the arrangement in FIG. 6 is applicable in a transceiver network element 101 for controlling transmission to a communications device or communications devices. The arrangement in FIG. 6 is also applicable in a communications device for controlling transmission to a transceiver network element. In addition, also transmissions between communications devices may be controlled.

Figure 7:
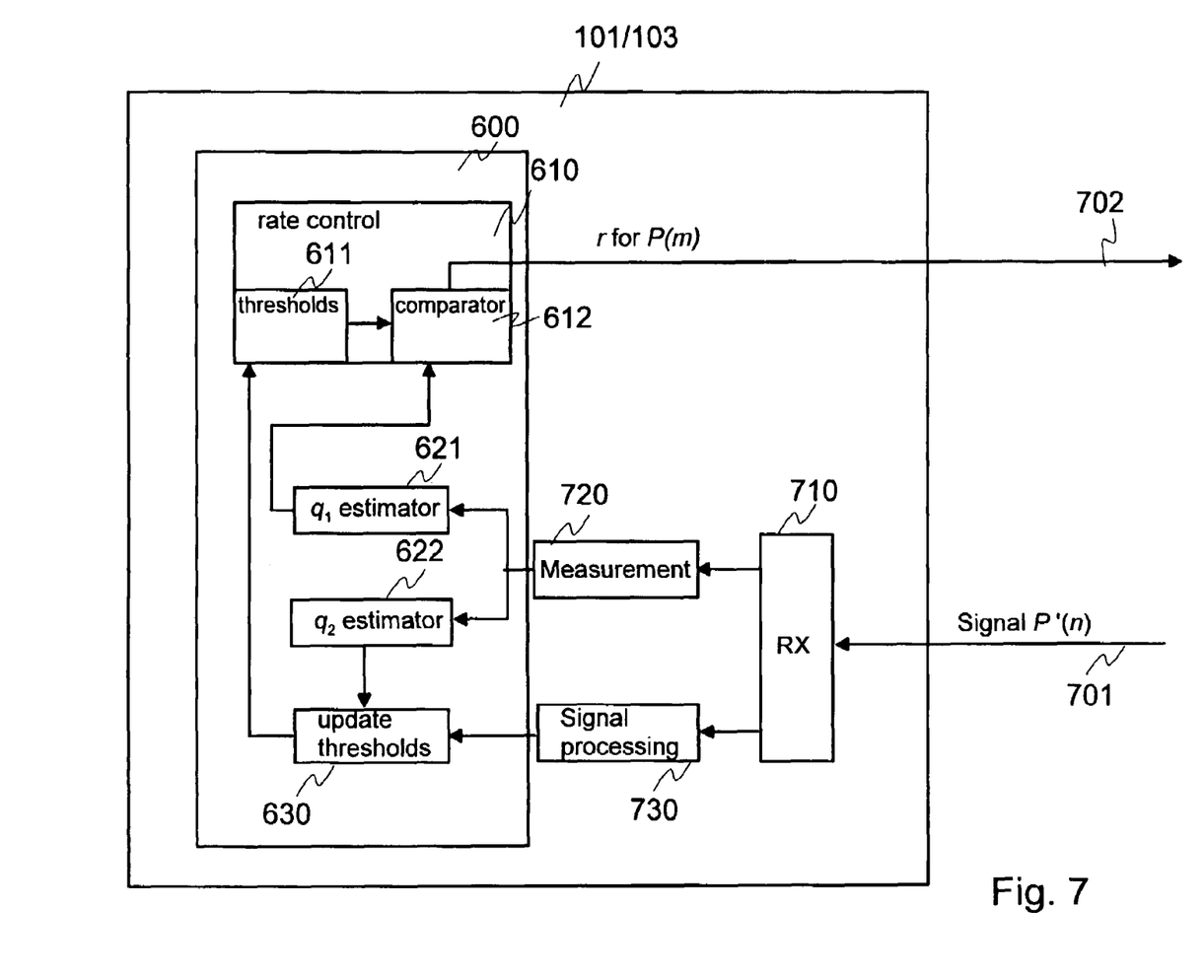
FIG. 7 shows, as a further example, a schematic block diagram of a communications device or that of a network element in accordance with an embodiment of the invention.

FIG. 7 shows, as a further example, a schematic block diagram of a device controlling transmission rate towards this device. The device in FIG. 7 may be a communications device 103 for downlink rate control or a network element 101 for uplink rate control in accordance with an embodiment of the invention. The difference between FIGS. 6 and 7 is that in FIG. 6 transmission rate from a device is controlled and in FIG. 7 the transmission rate to the device is controlled.

The device shown in FIG. 7 receives a signal relating to a packet P' transmitted for the n'th time (arrow 701). The signal is processed in a receiver RX 710 and in signal processing block 730. In a measurement block 720 measurement reports 702 are generated for the quality estimators 621 and 622. The signal processing block 730 is responsible for processing the receiving signal 701 for determining whether the packet P' has been received successfully. Indication of successful/unsuccessful receipt of packet P' is fed from the signal processing block 730 to the update thresholds block 630.

As FIG. 7 shows, the determined rate r for a packet P to be sent to the device shown in FIG. 7 for the m'th time is determined in rate control block 610. Information indicating the determined rate is then sent (arrow 702) to the entity, which will send the packet P for the m'th time.

In existing systems, the recipient knows for which specific packet and for how many'th retransmission of any packet rate r is to be determined through fixed timing. For example, in IS-856, if the m'th of subpacket of the packet P is received in error at time t−3, the (m+1)'th of subpacket of the packet P is transmitted at time t+1. If the m'th of subpacket of the packet P is received correctly at time t−3 in IS-856, the initial transmission of a new packet P' is transmitted at time t+1. FIG. 7 may be applied to a system without fixed time with the assistance of additional signaling that informs for which specific packet and for how many'th retransmission of any packet rate r is to be determined.

It is appreciated that FIG. 7 omits various features of adaptive HARQ. For example, sending an indication of receipt for the received packet P', measurement reports 702 and packet P are not shown in FIG. 7.

It is clear to one skilled in the art that other embodiments of the invention may be implemented similarly as the specific embodiment illustrated in FIGS. 6 and 7.

When link adaptation with adaptive HARQ is employed in the downlink direction, methods 200 and 210 or the transmission control block 600 are not typically implemented in a transceiver control network element 102. This is because the delay between a transceiver network element 101 and a control network element 102 is typically too long for controlling link adaptation between the transceiver network element 101 and the communications device 103. If the rate control is performed in a slower manner than in link adaptation, it may be possible to implement the transmission control block 600 jointly in a plurality of network elements of a communications system, typically in a transceiver network element 101 and in a control network element 102.

It is appreciated that although the description relating to FIGS. 2 to 5 is in line with FIG. 6, it is clear to one skilled in the art that features discussed in connection with FIG. 2 to 5 are also applicable when transmission rate is controlled for transmitting data to the party as FIG. 7 describes. Similarly, thresholds may be updated upon receiving a packet (FIG. 7) as well as when receiving an indication of receipt of a packet (FIG. 6).

Figure 8:
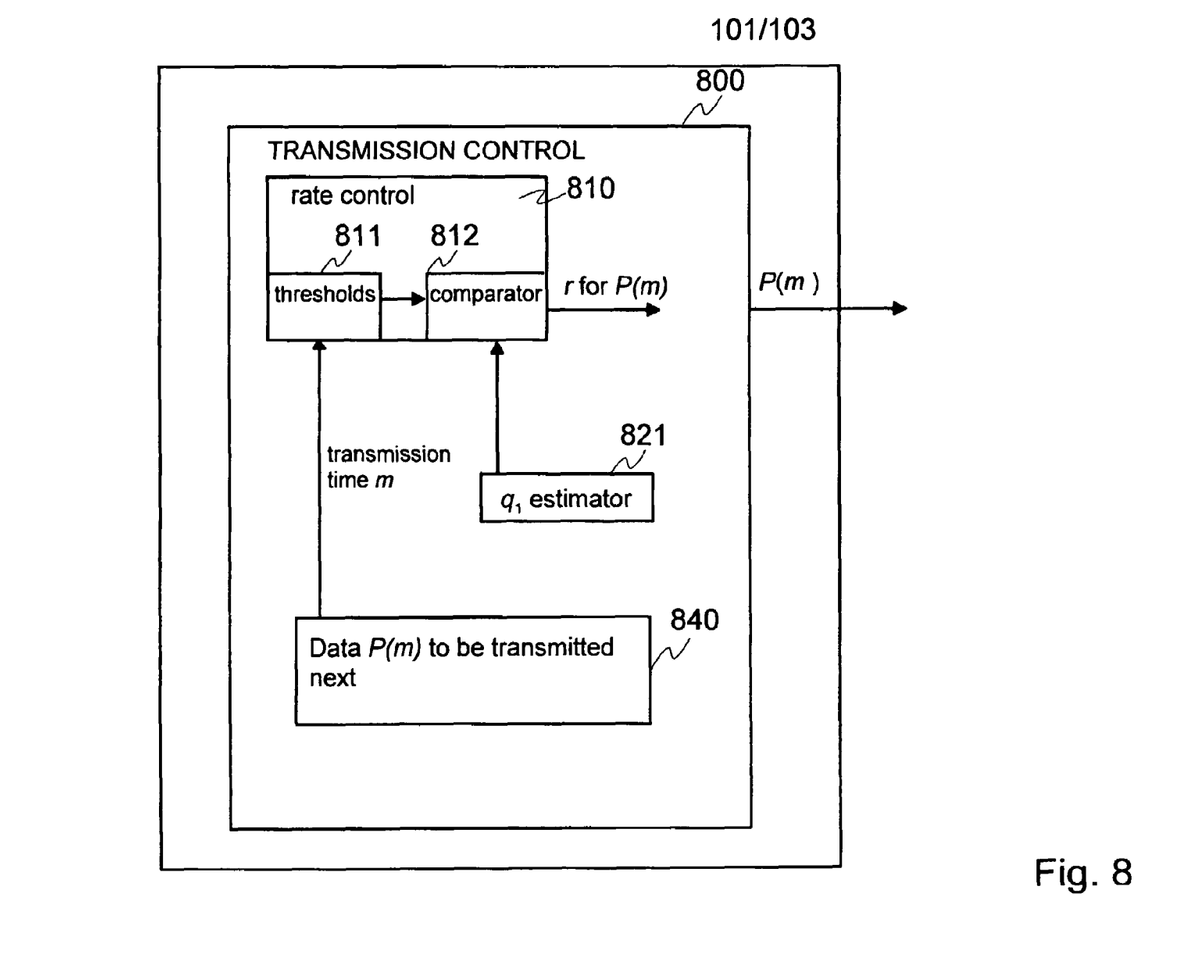
FIG. 8 shows, as an example, a schematic block diagram of a communications device or a network element in accordance with an embodiment of the invention.

FIG. 8 shows, as an example, a schematic block diagram of a communications device 103 or that of a network element 101 in accordance with an embodiment of the invention. The schematic block diagram in FIG. 8 focuses on transmitting at least a part of a set of data, and a data packet P is used as an example of at least a part of a set of data. The transmission control block 800 in FIG. 8 is in line with the transmission control block 600 in FIG. 6. In other words, the rate control unit 810 may be the same as the rate control unit 610 and block 840 could be shown in FIG. 6. Block 840 is, however, shown only in FIG. 8 for clarifying the separation between updating the thresholds (FIG. 6) and determining a transmission rate (FIG. 8).

The data to be transmitted typically originates from upper layer protocols. Block 840 determines the information to be transmitted next. Block 840 may be, for example, a HARQ control block or other control block relating to retransmissions. The transmission time m of packet P is determined in block 840 and fed to the thresholds block 811, so that the threshold or thresholds to which the estimated quality index $q_1$ is compared are dependent on the number of transmission times of the packet P.

Regarding FIG. 7, the transmission control block in the party transmitting the packets P and P' (this party is not shown in FIG. 7) needs to be able to receive the determined transmission rate r for packet P(m) and to control the transmission rate of packet P(m) accordingly.

It is appreciated that although only transmission rate control is discussed above, it is possible to combine the transmission rate control with, for example, power control. The present invention is intended to cover also link adaptation methods using power control together with transmission rate control. This way a more versatile link adaptation may be achieved. It is furthermore appreciated that transmission rate control may be applicable also otherwise than in link adaptation.

It is furthermore appreciated that although the explicit examples mentioned above relate to communication systems employing code division, the present invention may be applicable also in communication systems, where multiple access or multiplexing is based on other techniques than code division. Some examples of other multiple access or multiplexing techniques are time division/multiplexing, frequency division/multiplexing and Orthogonal Frequency Division Multiplexing (OFDM).

Although preferred embodiments of the apparatus and method embodying the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method, comprising:
   receiving information relating to at least a part of a first set of data;
   determining a number of times that said at least part of said first set of data has been transmitted; and
   updating at least one threshold for a quantity indicative of transmission conditions based on the determined number of times, said at least one threshold for determining a transmission rate for said at least part of said first set of data,
   wherein said updating comprises determining at least one threshold value set to be updated from a plurality of threshold value sets, a first threshold value set of said plurality of threshold value sets relating to at least a first number of times said at least a part of said first set of data has been transmitted, and a second threshold value set of said plurality of threshold value sets relating to at least a second number of times said at least part of said first set of data has been transmitted, and
   wherein said updating further comprises adjusting at least one threshold value in said at least one threshold value set based on at least one of the number of transmission times relating to the respective threshold value set and a target value for a second quantity indicative of transmission conditions.

2. The method as defined in claim 1, wherein said receiving comprises receiving said information relating to said at least part of said first set of data comprising an indication of receipt of said at least part of said first set of data.

3. The method as defined in claim 2, wherein said determining comprises determining the number of times that said at least part of said first set of data has been transmitted to a party, said party comprising sent said information relating to said at least part of said first set of data.

4. The method as defined in claim 3, wherein said updating comprises updating said at least one threshold for determining transmission rate for said at least part of said first set of data to be transmitted to said party.

5. The method as defined in claim 1, wherein said receiving comprises receiving said information relating to said at least part of said first set of data comprising said at least part of said first set of data.

6. The method as defined in claim 5, wherein said determining comprises determining the number of times that said at least part of said first set of data has been transmitted from a party, said party comprising sent said information relating to said at least part of said first set of data.

7. The method as defined in claim 6, wherein said updating comprises updating said at least one threshold for determining transmission rate for said at least part of said first set of data to be transmitted from said party.

8. The method as defined in claim 1, wherein said updating comprises adjusting each threshold value of said at least one threshold value set.

9. The method as defined in claim 1, wherein said updating comprises updating the threshold value set relating to the determined number of times.

10. The method as defined in claim 1, wherein said updating comprises updating threshold value sets relating to a number of times said at least part of said first set of data is transmitted being equal to or larger than the determined number of times.

11. The method as defined in claim 1, further comprising:
    providing at least two target values for the second quantity, a first target value relating to at least a first number of transmission times of said at least part of said first set of data and a second target value relating to at least a second number of transmission times.

12. The method as defined in claim 1, further comprising:
    providing a threshold value set for each number of times it is possible to transmit said at least part of said first set of data.

13. The method as defined in claim 1, further comprising:
    determining a first transmission rate, said first transmission rate configured to transmit said at least part of said first set of data,
    wherein said updating comprises adjusting at least one threshold value associated with said first transmission rate using a first adjustment parameter and adjusting at least one threshold value associated with a second transmission rate using a second adjustment parameter.

14. The method as defined in claim 1, further comprising:
    providing a plurality of transmission rates, each transmission rate comprising a relating threshold value.

15. The method as defined in claim 1, further comprising:
    determining, based on said information relating to said at least part of said first set of data, whether said at least part of said first set of data has been successfully received,
    wherein said updating comprises increasing said at least one threshold upon unsuccessful receipt of said at least part of said first set of data.

16. The method as defined in claim 1, further comprising:
    determining, based on said information relating to said at least part of said first set of data, whether said at least part of said first set of data has been successfully received,
    wherein said updating comprises decreasing said at least one threshold upon successful receipt of said at least part of said first set of data.

17. The method as defined in claim 1, further comprising:
    carrying out said updating in response to said receiving.

18. The method as defined in claim 1, further comprising:
determining a transmission rate for at least a part of a second set of data by comparing a value determined for the quantity indicative of transmission conditions to at least one threshold value, said at least one threshold value being dependent on a number of times that said at least part of said second set of data has been transmitted.

19. The method as defined in claim 18, further comprising:
transmitting the at least part of the second set of data using the determined transmission rate.

20. A method, comprising:
determining a value for a quantity indicative of transmission conditions, and
determining a transmission rate for at least a part of a set of data to be transmitted by comparing said determined value for said quantity indicative of transmission conditions to at least one threshold value, said at least one threshold value being dependent on a number of times data from said at least part of said set of data has previously been transmitted,
wherein said determining said transmission rate comprises updating said at least one threshold value,
wherein said updating comprises determining at least one threshold value set to be updated from a plurality of threshold value sets, a first threshold value set of said plurality of threshold value sets relating to at least a first number of times said at least a part of said first set of data has been transmitted, and a second threshold value set of said plurality of threshold value sets relating to at least a second number of times said at least part of said first set of data has been transmitted, and
wherein said updating further comprises adjusting at least one threshold value in said at least one threshold value set based on at least one of the number of transmission times relating to the respective threshold value set and a target value for a second quantity indicative of transmission conditions.

21. The method as defined in claim 20, further comprising:
transmitting said at least part of said set of data using said determined transmission rate.

22. The method as defined in claim 20, further comprising:
sending information indicating said determined transmission rate for transmitting said at least part of said set of data using said determined transmission rate.

23. The method as defined in claim 20, further comprising:
providing at least two threshold value sets, a first threshold value set relating to at least a first number of times said at least part of said set of data has been transmitted and a second threshold value set relating to at least a second number of times said at least part of said set of data has been transmitted.

24. The method as defined in claim 20, further comprising:
providing a set of data that is an encoder packet and at least a part of a set of data that is a subpacket relating to an encoder packet.

25. The method as defined in claim 1, further comprising:
providing a set of data that is a packet and at least a part of a set of data that is a data block relating to a packet.

26. An apparatus, comprising:
a receiver configured to receive information relating to at least a part of a first set of data;
a first processor configured to determine a number of times that said at least part of said first set of data has been transmitted; and
a second processor configured to update at least one threshold value for a quantity indicative of transmission conditions based on the determined number of times, said at least one threshold value for determining a transmission rate for said at least part of said first set of data,
wherein said second processor is further configured to:
determine at least one threshold value set to be updated from a plurality of threshold value sets, a first threshold value set of said plurality of threshold value sets relating to at least a first number of times said at least a part of said first set of data has been transmitted, and a second threshold value set of said plurality of threshold value sets relating to at least a second number of times said at least part of said first set of data has been transmitted, and
adjust at least one threshold value in said at least one threshold value set based on at least one of the number of transmission times relating to the respective threshold value set and a target value for a second quantity indicative of transmission conditions.

27. The apparatus as defined in claim 26, wherein said information relating to said at least part of said first set of data comprises an indication of receipt of said at least part of said first set of data.

28. The apparatus as defined in claim 27, wherein said at least one threshold is for determining a transmission rate for transmission from said apparatus.

29. The apparatus as defined in claim 27, further comprising:
a third processor configured to determine a transmission rate for at least a part of a second set of data by comparing a value determined for said quantity indicative of transmission conditions to said at least one threshold value, said at least one threshold value being dependent on a number of times that said at least part of said second set of data has been transmitted.

30. The apparatus as defined in claim 29, further comprising:
a transmitter configured to transmit the at least part of the second set of data using the determined transmission rate.

31. The apparatus as defined in claim 26, wherein said information relating to said at least part of said first set of data comprises said at least part of said first set of data.

32. The apparatus as defined in claim 29, wherein said at least one threshold is for determining a transmission rate for transmission to said apparatus.

33. The apparatus as defined in claim 31, further comprising:
a third processor configured to determine a transmission rate for at least a part of a second set of data by comparing a value determined for said quantity indicative of transmission conditions to said at least one threshold value, said at least one threshold value being dependent on a number of times that said at least part of said second set of data has been transmitted.

34. The apparatus as defined in claim 33, further comprising:
a transmitter configured to transmit information indicating the determined transmission rate for transmitting the at least part of the second set of data using the determined transmission rate to said apparatus.

35. The apparatus as defined in claim 26, further comprising:
a third processor configured to determine a transmission rate for at least a part of a second set of data by comparing a value determined for said quantity indicative of transmission conditions to said at least one threshold value, said at least one threshold value being dependent on a number of times that said at least part of said second set of data has been transmitted.

36. The apparatus as defined in claim 26, further comprising:
a network element for a communications system.

37. The apparatus as defined in claim 26, further comprising:
a communications device for a communications system.

38. A system, comprising:
a receiver configured to receive information relating to at least a part of a first set of data;
a first processor configured to determine a number of times that said at least part of said first set of data has been transmitted; and
a second processor configured to update at least one threshold for a quantity indicative of transmission conditions based on the determined number of times, said at least one threshold for determining a transmission rate for said at least part of said first set of data to be transmitted,
wherein said second processor is further configured to:
determine at least one threshold value set to be updated from a plurality of threshold value sets, a first threshold value set of said plurality of threshold value sets relating to at least a first number of times said at least a part of said first set of data has been transmitted, and a second threshold value set of said plurality of threshold value sets relating to at least a second number of times said at least part of said first set of data has been transmitted, and
adjust at least one threshold value in said at least one threshold value set based on at least one of the number of transmission times relating to the respective threshold value set and a target value for a second quantity indicative of transmission conditions.

39. An apparatus, comprising:
a first processor configured to determine a value for a quantity indicative of transmission conditions; and
a second processor configured to determine a transmission rate for at least a part of said set of data to be transmitted by comparing said determined value to at least one threshold for said quantity indicative of transmission conditions, said at least one threshold being dependent on the number of times data from said set of data has previously been transmitted,
wherein said second processor is further configured to:
update said at least one threshold value by determining at least one threshold value set to be updated from a plurality of threshold value sets, a first threshold value set of said plurality of threshold value sets relating to at least a first number of times said at least a part of said first set of data has been transmitted, and a second threshold value set of said plurality of threshold value sets relating to at least a second number of times said at least part of said first set of data has been transmitted, and
adjust at least one threshold value in said at least one threshold value set based on at least one of the number of transmission times relating to the respective threshold value set and a target value for a second quantity indicative of transmission conditions.

40. The apparatus as defined in claim 39, further comprising:
a transmitter configured to transmit said at least part of said set of data using said determined transmission rate.

41. The apparatus as defined in claim 39, wherein said transmitter further is configured to transmit information indicating said determined transmission rate for transmitting said at least part of said set of data using said determined transmission rate to said apparatus.

42. The apparatus as defined in claim 39, further comprising:
a network element for a communications system.

43. The apparatus as defined in claim 39, further comprising:
a communications device for a communications system.

44. A system, comprising:
a first processor configured to determine a value for a quantity indicative of transmission conditions; and
a second processor configured to determine a transmission rate for at least a part of said set of data to be transmitted by comparing said determined value to at least one threshold for said quantity indicative of transmission conditions, said at least one threshold being dependent on the number of times data from said set of data has previously been transmitted,
wherein said second processor is further configured to:
update said at least one threshold value by determining at least one threshold value set to be undated from a plurality of threshold value sets, a first threshold value set of said plurality of threshold value sets relating to at least a first number of times said at least a part of said first set of data has been transmitted, and a second threshold value set of said plurality of threshold value sets relating to at least a second number of times said at least part of said first set of data has been transmitted, and
adjust at least one threshold value in said at least one threshold value set based on at least one of the number of transmission times relating to the respective threshold value set and a target value for a second quantity indicative of transmission conditions.

45. An apparatus, comprising:
receiving means for receiving information relating to at least a part of a first set of data;
determining means for determining a number of times that said at least part of said first set of data has been transmitted; and
processing means for updating at least one threshold for a quantity indicative of transmission conditions based on the determined number of times, said at least one threshold configured to determine a transmission rate for said at least part of said first set of data,
wherein said processing means is further for:
determining at least one threshold value set to be updated from a plurality of threshold value sets, a first threshold value set of said plurality of threshold value sets relating to at least a first number of times said at least a part of said first set of data has been transmitted, and a second threshold value set of said plurality of threshold value sets relating to at least a second number of times said at least part of said first set of data has been transmitted, and
adjusting at least one threshold value in said at least one threshold value set based on at least one of the number of transmission times relating to the respective threshold value set and a target value for a second quantity indicative of transmission conditions.

46. A system, comprising:
receiving means for receiving information relating to at least a part of a first set of data;
determining means for determining a number of times that said at least part of said first set of data has been transmitted; and processing means for updating at least one threshold for a quantity indicative of transmission conditions based on the determined number of times, said at least one threshold configured to determine a transmission rate for said at least part of said first set of data, wherein said processing means is further for:
  determining at least one threshold value set to be updated from a plurality of threshold value sets, a first threshold value set of said plurality of threshold value sets relating to at least a first number of times said at least a part of said first set of data has been transmitted, and a second threshold value set of said plurality of threshold value sets relating to at least a second number of times said at least part of said first set of data has been transmitted, and
  adjusting at least one threshold value in said at least one threshold value set based on at least one of the number of transmission times relating to the respective threshold value set and a target value for a second quantity indicative of transmission conditions.

47. An apparatus, comprising:

first processing means for determining a value for a quantity indicative of transmission conditions; and second processing means for determining a transmission rate for at least a part of said set of data to be transmitted by comparing said determined value to at least one threshold for said quantity indicative of transmission conditions, said at least one threshold being dependent on the number of times data from said set of data has previously been transmitted, wherein second processing means is further for:
  updating said at least one threshold value by determining at least one threshold value set to be updated from a plurality of threshold value sets, a first threshold value set of said plurality of threshold value sets relating to at least a first number of times said at least a part of said first set of data has been transmitted, and a second threshold value set of said plurality of threshold value sets relating to at least a second number of times said at least part of said first set of data has been transmitted, and
  adjusting at least one threshold value in said at least one threshold value set based on at least one of the number of transmission times relating to the respective threshold value set and a target value for a second quantity indicative of transmission conditions.

48. A system, comprising:

first processing means for determining a value for a quantity indicative of transmission conditions; and second processing means for determining a transmission rate for at least a part of said set of data to be transmitted by comparing said determined value to at least one threshold for said quantity indicative of transmission conditions, said at least one threshold being dependent on the number of times data from said set of data has previously been transmitted, wherein second processing means is further for:
  updating said at least one threshold value by determining at least one threshold value set to be updated from a plurality of threshold value sets, a first threshold value set of said plurality of threshold value sets relating to at least a first number of times said at least a part of said first set of data has been transmitted, and a second threshold value set of said plurality of threshold value sets relating to at least a second number of times said at least part of said first set of data has been transmitted, and
  adjusting at least one threshold value in said at least one threshold value set based on at least one of the number of transmission times relating to the respective threshold value set and a target value for a second quantity indicative of transmission conditions.

* * * * *